US010298875B2

(12) United States Patent
Klein et al.

(10) Patent No.: US 10,298,875 B2
(45) Date of Patent: May 21, 2019

(54) SYSTEM, DEVICE, AND METHOD FOR EVIDENTIARY MANAGEMENT OF DIGITAL DATA ASSOCIATED WITH A LOCALIZED MIRANDA-TYPE PROCESS

(71) Applicant: MOTOROLA SOLUTIONS, INC, Chicago, IL (US)

(72) Inventors: David Klein, Parkland, FL (US); David Larson, Seattle, WA (US); Lisajane M. Romer, Delray Beach, FL (US); Scott M. Alazraki, Davie, FL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 44 days.

(21) Appl. No.: 15/448,618

(22) Filed: Mar. 3, 2017

(65) Prior Publication Data
US 2018/0255269 A1 Sep. 6, 2018

(51) Int. Cl.
*H04N 5/913* (2006.01)
*G11B 27/34* (2006.01)
*G11B 27/19* (2006.01)
*H04N 5/77* (2006.01)
*H04N 9/802* (2006.01)
*G10L 19/018* (2013.01)

(52) U.S. Cl.
CPC ............ *H04N 5/913* (2013.01); *G11B 27/19* (2013.01); *G11B 27/34* (2013.01); *H04N 5/77* (2013.01); *H04N 9/802* (2013.01); *G10L 19/018* (2013.01); *H04N 2005/91335* (2013.01)

(58) Field of Classification Search
CPC .......... H04N 5/913; H04N 5/77; H04N 9/802; H04N 2005/91335; G11B 27/19; G11B 27/34; G10L 19/018
See application file for complete search history.

(56) References Cited

U.S. PATENT DOCUMENTS

| 9,178,995 B2 | 11/2015 | Costa et al. | |
|---|---|---|---|
| 2002/0095292 A1* | 7/2002 | Mittal | G10L 21/06 704/270 |
| 2003/0191740 A1* | 10/2003 | Stark | G06F 16/951 |
| 2004/0260560 A1* | 12/2004 | Holloway | H04L 12/64 704/273 |
| 2006/0038678 A1* | 2/2006 | Avneri | B61B 3/02 340/541 |
| 2006/0171539 A1* | 8/2006 | Winningstad | H04M 1/05 380/270 |

(Continued)

*Primary Examiner* — Thai Q Tran
*Assistant Examiner* — Sunghyoun Park
(74) *Attorney, Agent, or Firm* — Daniel R. Bestor

(57) ABSTRACT

An evidentiary management process for digital data associated with a localized Miranda-type process includes first detecting an electronic Miranda-type process trigger event, capturing audio/video of a suspect and storing a unique identifier of the suspect, selecting a particular stored Miranda-type warning variation, and then playing back the selected warning variation and storing an indication thereof. Then the unique identifier of the suspect and the stored indication of the warning variation are aggregated into a single data structure. An electronic anti-tamper process is then applied to the single data structure to generate an anti-tamper indicator, and the single data structure and anti-tamper indicator are stored or transmitted to a remote device.

18 Claims, 3 Drawing Sheets

(56) References Cited

U.S. PATENT DOCUMENTS

| | | |
|---|---|---|
| 2007/0040690 A1 | 2/2007 | Georgalas et al. |
| 2007/0122003 A1* | 5/2007 | Dobkin ............ G08B 13/19608 382/115 |
| 2009/0067671 A1* | 3/2009 | Alattar .................. G06T 1/0028 382/100 |
| 2010/0223050 A1* | 9/2010 | Kelly ..................... G06Q 30/02 704/8 |
| 2012/0129596 A1* | 5/2012 | Thackston .......... G07F 17/3206 463/29 |
| 2014/0140497 A1 | 5/2014 | Ripa et al. |
| 2016/0042767 A1* | 2/2016 | Araya .................... G11B 19/02 386/201 |
| 2017/0086050 A1* | 3/2017 | Kerning ................. H04W 4/22 |

\* cited by examiner

SYSTEM, DEVICE, AND METHOD FOR EVIDENTIARY MANAGEMENT OF DIGITAL DATA ASSOCIATED WITH A LOCALIZED MIRANDA-TYPE PROCESS

BACKGROUND OF THE INVENTION

Tablets, laptops, phones, mobile or portable radios, and other mobile computing devices are now in common use by users, such as first responders (including firemen, police officers, and paramedics, among others), and provide such users with instant access to increasingly valuable additional information and resources such as vehicle histories, arrest records, outstanding warrants, health information, and other information that may aid the user in making a more informed determination of an action to take or how to resolve a situation, among other possibilities. In addition, video coverage of many major metropolitan areas is reaching a point of saturation such that nearly every square foot of some cities is under surveillance by at least one static or moving camera (with or without audio capture capabilities). Currently, some governmental agencies are deploying government-owned cameras or are obtaining legal access to privately owned cameras, or some combination thereof, and are deploying command centers to monitor these cameras.

Some governmental agencies, in particular police and security agencies, may be involved in situations and incidents where local or national law requires that suspects or potential suspects be informed of their rights under the law before the suspects or potential suspects can be arrested or further questioned regarding a particular incident, act, or status (e.g., what is identified as a Miranda process in the United States and hereinafter referred to as a Miranda-type process to refer to similar requirements world-wide). Due to concerns such as security, preservation of evidence, and varying local and national requirements, governmental agencies have been cautious in leveraging the above-mentioned technological advances in the Miranda-type process.

Thus, there exists a need for a technical method, device, and system for improving and managing security, digital evidence preservation, and content variations with respect to electronic management of digital data associated with a localized Miranda-type process at an incident.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
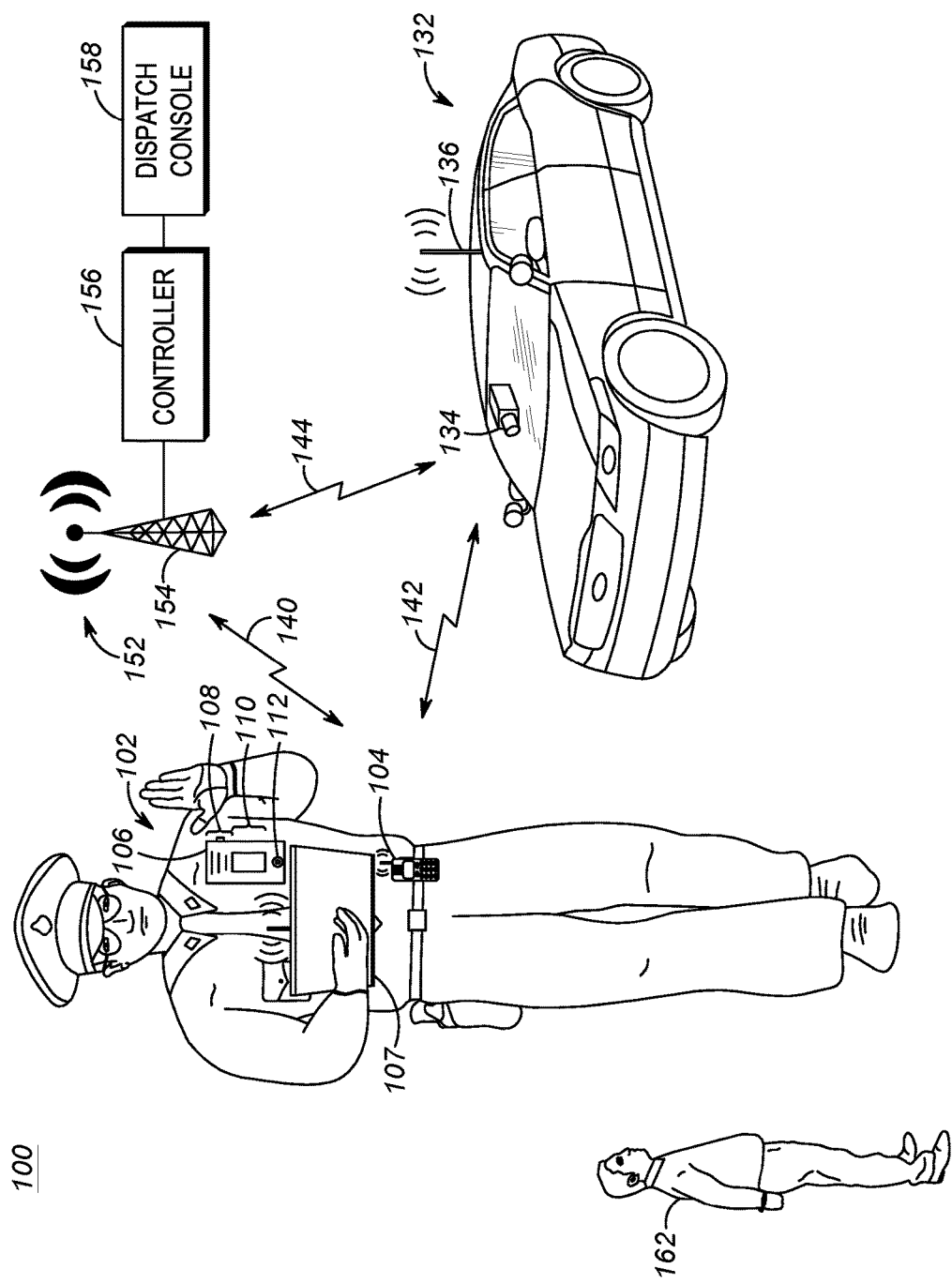
FIG. 1 is a system diagram illustrating a device and system for improving and managing security, digital evidence preservation, and content variations with respect to electronic management of digital data associated with a localized Miranda-type process at an incident, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method, device, and system for improving and managing security, digital evidence preservation, and content variations with respect to electronic management of digital data associated with a localized Miranda-type process at an incident.

In one embodiment a method for evidentiary management of digital data associated with a localized Miranda-type process at an incident scene includes: detecting, at a computing device at the incident scene, an electronic Miranda-type process trigger event; capturing, via an audio and/or video capture device communicatively coupled to the computing device, an electronic audio and/or video capture of a suspect at the incident scene and storing one or more unique identifiers of the suspect as a function of the audio and/or video capture; selecting, by the computing device and from a plurality of different stored Miranda-type warning variations, a particular stored Miranda-type warning variation based on at least one of a determined age of the suspect, a determined spoken language associated with the suspect, and a determined current jurisdiction of the incident scene; playing back, by the computing device and from an electronic output device communicatively coupled to the computing device, the stored particular Miranda-type warning variation and storing an indication of the selected particular Miranda-type warning variation played back; aggregating, by the computing device, the one or more unique identifiers of the suspect and the stored indication of the particular stored Miranda-type warning variation played back into a single data structure; applying, by the computing device, an electronic anti-tamper process to the single data structure to generate an anti-tamper indicator indicative of a tamper state of the single data structure and can be applied in a separate process to verify whether data contained in the single data structure is modified after the anti-tamper indicator is generated; and one of locally storing and wirelessly or wiredly uploading to a remote computing device, by the computing device, the single data structure and the anti-tamper indicator.

In a further embodiment, a computing device includes: a memory storing non-transitory computer-readable instructions; a transceiver; and one or more processors configured to, in response to executing the non-transitory computer-readable instructions, perform a first set of functions comprising: detect an electronic Miranda-type process trigger event; capture, via an audio and/or video capture device communicatively coupled to the computing device, an electronic audio and/or video capture of a suspect at the incident scene and storing one or more unique identifiers of the suspect as a function of the audio and/or video capture; select, from a plurality of different stored Miranda-type warning variations, a particular stored Miranda-type warning variation based on at least one of a determined age of the suspect, a determined spoken language associated with the suspect, and a determined current jurisdiction of the incident scene; play back, from an electronic output device communicatively coupled to the computing device, the stored particular Miranda-type warning variation and storing an indication of the selected particular Miranda-type warning variation played back; aggregate the one or more unique identifiers of the suspect and the stored indication of the particular stored Miranda-type warning variation played back into a single data structure; apply an electronic anti-tamper process to the single data structure to generate an anti-tamper indicator indicative of a tamper state of the single data structure and can be applied in a separate process to verify whether data contained in the single data structure is modified after the anti-tamper indicator is generated; and one of locally store and wirelessly or wiredly upload to a remote computing device the single data structure and the anti-tamper indicator.

Each of the above-mentioned embodiments will be discussed in more detail below, starting with example communication and device architectures of the system in which the embodiments may be practiced, followed by an illustration of processing steps for achieving an improved method, device, and system for improving and managing security, digital evidence preservation, and content variations with respect to electronic management of digital data associated with a localized Miranda-type process at an incident. Further advantages and features consistent with this disclosure will be set forth in the following detailed description, with reference to the figures.

1. COMMUNICATION SYSTEM AND DEVICE STRUCTURES

Referring now to the drawings, and in particular FIG. 1, a communication system diagram illustrates a system 100 of devices including a first set of devices that a user 102 (illustrated in FIG. 1 as a first responder police officer) may wear, including a primary battery-powered portable radio 104 used for narrowband and/or broadband direct-mode or infrastructure communications, a battery-powered radio speaker microphone (RSM) video capture device 106, and/or a laptop 107 having an integrated video camera and used for data applications such as incident support applications. System 100 may also include a vehicular mobile computing device (not shown) in a vehicle 132 associated with the user 102 and having an associated vehicular video camera 134 and vehicular transceiver 136. Each of the portable radio 104, RSM video capture device 106, tablet 107, and vehicular transceiver 136 may be capable of directly wirelessly communicating via a direct-mode wireless link 142, and/or may be capable of wirelessly communicating via a wireless infrastructure radio access network (RAN) 152 over respective wireless links 140, 144.

The portable radio 104 may be any mobile computing device used for infrastructure RAN or direct-mode media (e.g., voice, audio, video, etc.) communication via a long-range wireless transmitter and/or transceiver that has a transmitter transmit range on the order of miles, e.g., 0.5-50 miles, or 3-20 miles (e.g., in comparison to a short-range transmitter such as a Bluetooth, Zigbee, or NFC transmitter) with other mobile computing devices and/or the infrastructure RAN. The long-range transmitter may implement a conventional or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE) protocol including multimedia broadcast multicast services (MBMS), an open mobile alliance (OMA) push to talk (PTT) over cellular (OMA-PoC) standard, a voice over IP (VoIP) standard, or a PTT over IP (PoIP) standard. In still further embodiments, the long range transmitter may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard. Other types of long-range wireless protocols could be implemented as well. In the example of FIG. 1, the portable radio 104 may form the hub of communication connectivity for the user 102, through which other accessory devices, such as a biometric sensor, an activity tracker, a weapon status sensor, a heads-up-display, the RSM video capture device 106, and/or the tablet 107 may communicatively couple.

In order to communicate with and exchange video, audio, and other media and communications with the RSM video capture device 106 and/or the tablet 107, the portable radio 104 may contain one or more physical electronic ports (such as a USB port, an Ethernet port, an audio jack, etc.) for direct electronic coupling with the RSM video capture device 106 or tablet 107, and/or may contain a short-range transmitter (e.g., in comparison to the long-range transmitter such as a LMR or Broadband transmitter) and/or transceiver for wirelessly coupling with the RSM video capture device 106 or tablet 107. The short-range transmitter may be a Bluetooth, Zigbee, or NFC transmitter having a transmit range on the order of 0.01-100 meters, or 0.1-10 meters. In other embodiments, the RSM video capture device 106 and/or the tablet 107 may contain their own long-range transceivers and may communicate with one another and/or with the infrastructure RAN 152 or vehicular transceiver 136 directly without passing through portable radio 104.

The RSM video capture device 106 provides voice functionality features similar to a traditional RSM, including one or more of acting as a remote microphone that is closer to the user's 102 mouth, providing a remote speaker allowing play back of audio closer to the user's 102 ear, and including a push-to-talk (PTT) switch or other type of PTT input. The voice and/or audio recorded at the remote microphone may be provided to the portable radio 104 storage and/or analysis or for further transmission to other mobile communication devices or the infrastructure RAN 152 or may be directly transmitted by the RSM video capture device 106 to other mobile computing devices or the infrastructure RAN 152. The voice and/or audio played back at the remote speaker may be received from the portable radio 104 or directly from one or more other mobile computing devices or the infrastructure RAN. The RSM video capture device 106 may include a separate physical PTT switch 108 that functions, in cooperation with the portable radio 104 or on its own, to maintain the portable radio 104 and/or RSM video capture device 106 in a monitor only mode, and which switches the devices to a transmit-only mode (for half-duplex devices) or transmit and receive mode (for full-duplex devices) upon depression or activation of the PTT switch 108. The portable radio 104 and/or RSM video capture device 106 may form part of a group communications architecture that allows a single mobile computing device to communicate with one or more group members (not shown) associated with a particular group of devices at a same time.

Additional features may be provided at the RSM video capture device 106 as well. For example, a display screen 110 may be provided for displaying images, video, and/or text to the user 102. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data (for further analysis) or transmit the captured image data as an image or video stream to the portable radio 104 and/or to other mobile computing devices or to the infrastructure RAN directly. The video camera 112 and RSM remote microphone may be used, for example, for capturing audio and/or video of a suspect 162 and the suspect's surroundings, storing the captured image and/or audio data for further analysis or transmitting the captured image and/or audio data as a video and/or audio stream to the portable radio 104 and/or to other mobile computing devices or to the infrastructure RAN directly for further analysis.

The tablet 107 may be any wireless computing device used for infrastructure RAN or direct-mode media (e.g., voice, audio, video, etc.) communication via a long-range or short-range wireless transmitter with other mobile computing devices and/or the infrastructure RAN 152. The tablet includes a display screen for displaying a user interface to an operating system and one or more applications running on the operating system, such as a broadband PTT communications application, a web browser application, a vehicle history database application, an arrest record database application, an outstanding warrant database application, a mapping and/or navigation application, a health information database application, or other types of applications that may require user interaction to operate. The tablet display screen may be, for example, an LCD screen or an OLED display screen. In some embodiments, a touch sensitive input interface may be incorporated into the display screen as well, allowing the user 102 to interact with content provided on the display screen. A soft PTT input may also be provided, for example, via such a touch interface.

Front and/or rear-facing video cameras may also be provided at the tablet 107, integrating an ability to capture video and/or audio of the user 102 and the user's 102 surroundings, or a suspect 162 (or potential suspect) and the suspect's surroundings, and store and/or otherwise process the captured video and/or audio for further analysis or transmit the captured video and/or audio as a video and/or audio stream to the portable radio 104, other mobile computing devices, and/or the infrastructure RAN 152 for further analysis.

The vehicle 132 may be any type of vehicle associated with the user 102, and may include its own vehicular video camera 134 and vehicular transceiver 136. The vehicular transceiver 136 may include a long-range transceiver for directly wirelessly communicating with mobile computing devices such as the portable radio 104, the RSM 106, and the tablet 107, and/or for wirelessly communicating with the RAN 152 via wireless link 144. The vehicular transceiver 136 may further include a short-range wireless transceiver or wired transceiver for communicably coupling with the vehicular video camera 134. An additional electronic processor (not shown) may be disposed in the vehicle, in the video camera 134, and/or with the vehicular transceiver 136 for storing and/or processing video and/or audio produced by the video camera 134 and/or transmitting the captured video and/or audio as a video and/or audio stream to the portable radio 104, other mobile computing devices, and/or the infrastructure RAN 152 for further analysis. A microphone (not shown) may be integrated in the video camera 134 or made available at a separate location of the vehicle and communicably coupled to the electronic processor and vehicular transceiver 136 for capturing audio and similarly storing, processing, and/or transmitting the audio under control of the additional electronic processor.

Although RSM 106, laptop 107, and vehicle 132 are illustrated in FIG. 1 as providing example video cameras and/or microphones for generating audio and/or video streams for use in managing security, digital evidence preservation, and content variations with respect to electronic management of digital data associated with a localized Miranda-type process at an incident, in other embodiments, other types of cameras and/or microphones could be used as well, including but not limited to, video cameras secured to lamp posts, automated teller machine (ATM) video cameras, air or land-based drone-attached video cameras, or other types of audio and/or video recording devices accessible via a wired or wireless network interface same or similar to that disclosed herein.

Infrastructure RAN 152 may implement over wireless links 140, 144 a conventional or trunked LMR standard or protocol such as DMR, a P25 standard defined by the APCO, TETRA, or other LMR radio protocols or standards. In other embodiments, infrastructure RAN 152 may additionally or alternatively implement over wireless links 140, 144 an LTE protocol including MBMS, an OMA-PoC standard, a VoIP standard, or a PoIP standard. In still further embodiments, infrastructure RAN 152 may additionally or alternatively implement over wireless links 140, 144 a Wi-Fi protocol perhaps in accordance with an IEEE 802.11 standard (e.g., 802.11a, 802.11b, 802.11g) or a WiMAX protocol perhaps operating in accordance with an IEEE 802.16 standard. Other types of wireless protocols could be implemented as well. The infrastructure RAN 152 is illustrated in FIG. 1 as providing coverage for the portable radio 104, RSM video capture device 106, tablet 107, and vehicle transceiver 136 via a single fixed terminal 154 coupled to a controller 156 (e.g., radio controller, call controller, PTT server, zone controller, MME, BSC, MSC, site controller, Push-to-Talk controller, or other network device) and including a dispatch console 158 operated by a dispatcher.

The controller 156 illustrated in FIG. 1 may additional or alternatively operate as a back-end audio and/or video processing electronic computing device or remote cloud-based storage device consistent with the remainder of this disclosure.

Figure 2:
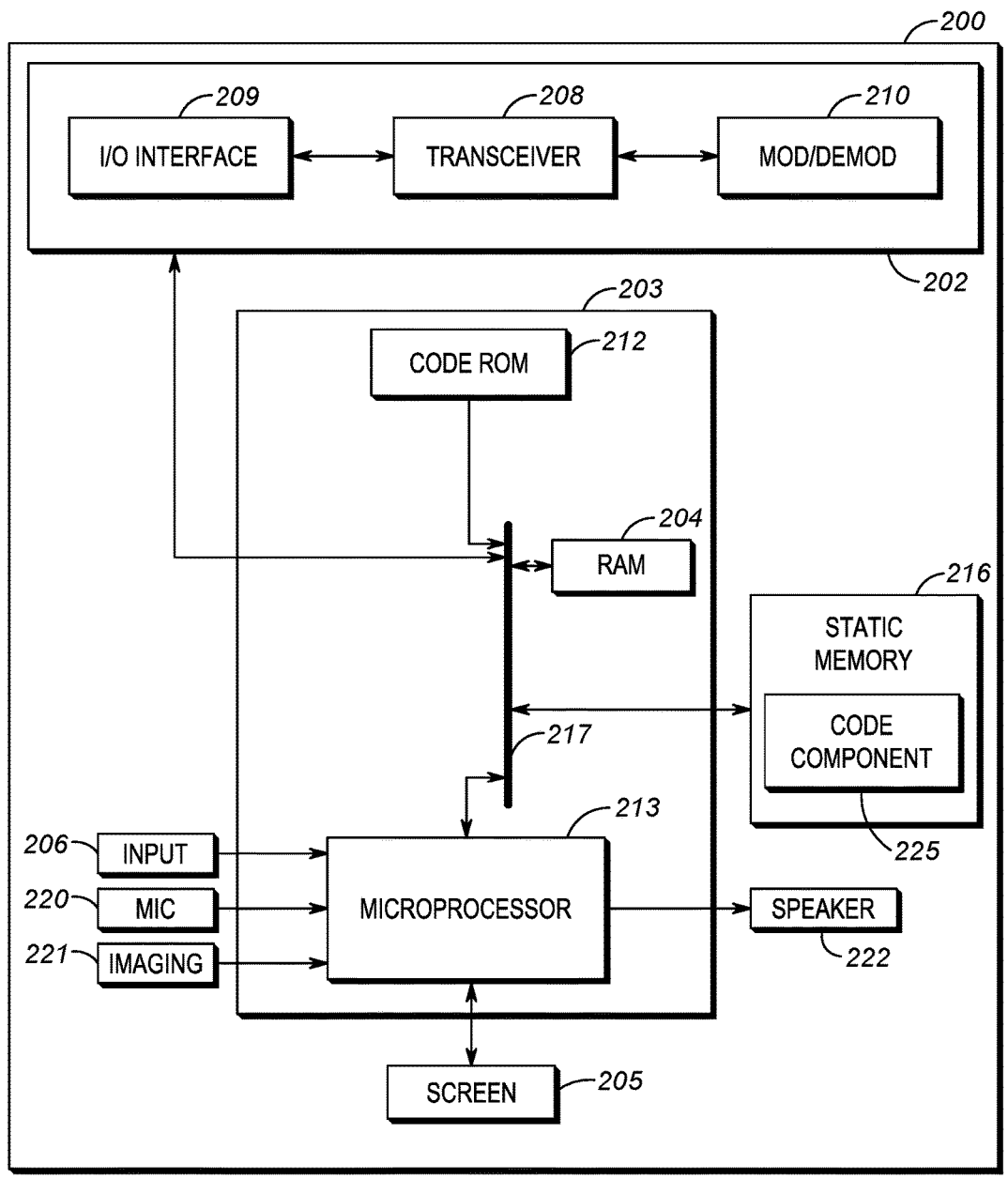
FIG. 2 is a device diagram showing a device structure of a computing device of FIG. 1 in accordance with some embodiments.

Referring to FIG. 2, a schematic diagram illustrates a computing device 200 according to some embodiments of the present disclosure. Computing device 200 may be, for example, the same as or similar to the portable radio 104, RSM video capture device 106, tablet 107, vehicular electronic processor, or controller 156 of FIG. 1, and/or may be a distributed computing device across two or more of the foregoing and linked via a wired and/or wireless communication link(s). As shown in FIG. 2, computing device 200 includes a communications unit 202 coupled to a common data and address bus 217 of a processing unit 203. The computing device 200 may also include an input unit (e.g., keypad, pointing device, touch-sensitive surface, etc.) 206 and a display screen 205, each coupled to be in communication with the processing unit 203.

A microphone 220 may be present for capturing audio from a user and/or suspect that is further processed by processing unit 203 in accordance with the remainder of this disclosure and/or is transmitted as voice stream data by communication unit 202 to other portable radios and/or other electronic computing devices. An imaging device 221 may provide video (still or moving images) of an area in a field of view of the computing device 200 for further processing by the processing unit 203 and/or for further transmission by communications unit 202. A communications speaker 222 may be present for reproducing audio that is decoded from voice streams of voice calls received via the communication unit 202 from other portable radios, from digital audio stored at the computing device 200, from other ad-hoc or direct mode devices, and/or from an infrastructure RAN device, or may play back alert tones or other types of pre-recorded audio.

The processing unit 203 may include a code Read Only Memory (ROM) 212 coupled to the common data and address bus 217 for storing data for initializing system components. The processing unit 203 may further include a microprocessor 213 coupled, by the common data and address bus 217, to a Random Access Memory (RAM) 204 and a static memory 216.

The communications unit 202 may include one or more wired or wireless input/output (I/O) interfaces 209 that are configurable to communicate with other devices, such as a portable radio, tablet, wireless RAN, and/or vehicular transceiver.

The communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), an LTE transceiver, a WiMAX transceiver perhaps operating in accordance with an IEEE 802.16 standard, and/or other similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The microprocessor 213 has ports for coupling to the input unit 206 and the microphone unit 220, and to the display screen 205, imaging device 221, and speaker 222. Static memory 216 may store operating code 225 for the microprocessor 213 that, when executed, performs one or more of the computing device steps set forth in FIG. 3 and accompanying text. Static memory 216 may also store, permanently or temporarily, a plurality of Miranda-type warnings that may differ based on age of a suspect, language of a suspect, or jurisdiction of an incident, a plurality of unique identifiers of particular suspects, a plurality of stored indications of a particular stored Miranda-type warning variation played back to particular suspects, a plurality of stored corresponding indications of acknowledgments associated with particular suspects, additional metadata associated with localized Miranda-type processes associated with particular suspects, along with corresponding single data structures aggregating the aforementioned information relative to a particular suspect, a plurality of anti-tamper indicators associated with corresponding single data structures, and/or stored confirmations of successful uploads of single data structures and corresponding anti-tamper indicators, among other possibilities.

Static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

2. PROCESSES FOR MANAGING SECURITY, DIGITAL EVIDENCE PRESERVATION, AND CONTENT VARIATIONS WITH RESPECT TO ELECTRONIC MANAGEMENT OF DIGITAL DATA ASSOCIATED WITH A LOCALIZED MIRANDA-TYPE PROCESS AT AN INCIDENT

Figure 3:
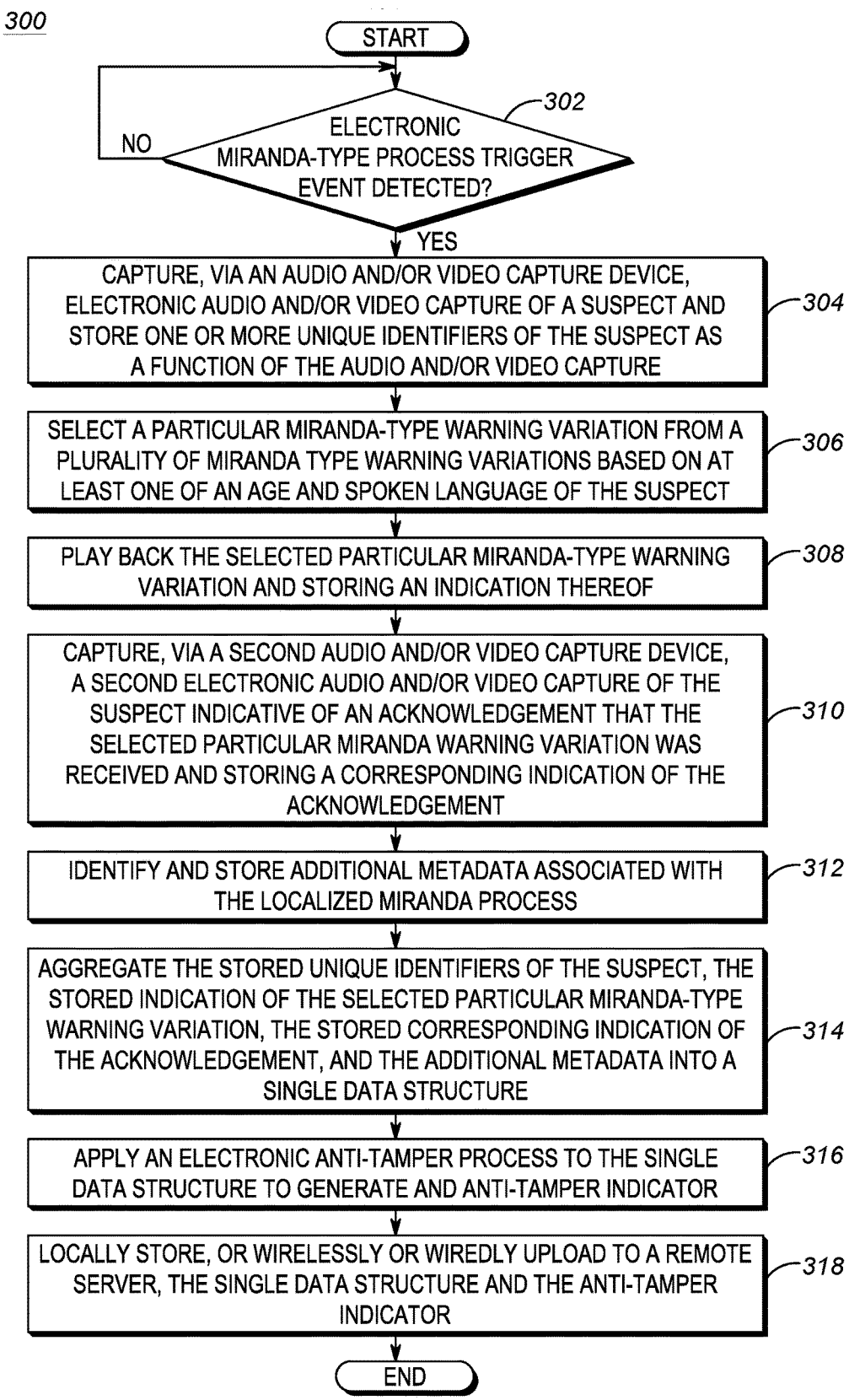
FIG. 3 illustrates a flow chart setting forth process steps for operating the computing device(s) of FIGS. 1 and/or 2 to improve and manage security, digital evidence preservation, and content variations with respect to electronic management of digital data associated with a localized Miranda-type process at an incident in accordance with some embodiments.

Turning now to FIG. 3, a flow chart diagram illustrates a process 300 for improving and managing security, digital evidence preservation, and content variations with respect to electronic management of digital data associated with a localized Miranda-type process at an incident. While a particular order of processing steps, message receptions, and/or message transmissions is indicated in FIG. 3 for exemplary purposes, timing and ordering of such steps, receptions, and transmissions may vary where appropriate without negating the purpose and advantages of the examples set forth in detail throughout the remainder of this disclosure. The computing device may execute process 300 at power-on, at some predetermined periodic time period thereafter, in response to a trigger raised locally at the device via an internal process or via an input interface (e.g., the user enabling a particular feature associated with process 300 or the computing device detecting that the computing device has entered a particular area or that a user thereof has exited a particular area or vehicle, among other possibilities), or in response to detecting a trigger from a portable radio, vehicle, or infrastructure controller to which it is communicably coupled, among other possibilities.

The computing device executing process 300 may include an edge device same or similar to any one or more of the portable radio 104, the RSM 106, the laptop 107, or the vehicle camera 134 illustrated in FIG. 1, or may include an infrastructure device same or similar to the controller 156 of FIG. 1, among other possibilities. Accordingly, an imaging device generating the audio and/or video at step 302 may also be the device processing the audio and/or video, or the imaging device generating the audio and/or video at step 302 may wirelessly or wiredly transmit the generated audio and/or video to another computing device for further processing. For example, in one embodiment, the laptop 107 computing device of FIG. 1 may perform all steps of FIG. 1, while in other embodiments, the laptop 107 may perform some portion of process 300 (such as steps 302-304, and 308-312), while another infrastructure controller 156 computing device performs a remaining portion of process 300 (such as steps 306, and 314-318). Other combinations are possible as well.

Process 300 begins at step 302 where a computing device determines if an electronic Miranda-type process trigger event has been detected. The electronic Miranda-type process trigger event may be generated in a number of ways, and may be detected by the computing device in a corresponding number of different ways. As a first example, a user 102 such as the officer of FIG. 1 may operate a user-interface of the computing device corresponding to a request to generate an electronic Miranda-type process trigger event and the computing device may subsequently detect a generated Miranda-type process trigger event as a result of the user-interface manipulation. The user-interface may include a physical user-interface such as a physical or touch-sensitive button particularly assigned to the Miranda-type process trigger and that, when manipulated by the user, generates the Miranda-type process trigger, or may include an audio/video interface in which a spoken command such as "read the Miranda rights" or a particular hand gesture associated with a command to "read the Miranda rights" is detected via audio and/or video analysis an audio/video stream capture at the computing device.

In a second example, another computing device or accessory device communicatively coupled to the computing device, such as the RSM 106 or the vehicle 132 computing device may generate a Miranda-type process trigger (via a corresponding user interface or some other input or event detection) and transmit a corresponding instruction to the computing device (perhaps operating as the portable radio 104 or the controller 156 of FIG. 1) that, subsequent to receipt at the computing device, causes the computing device to detect the Miranda-type process trigger. As a further example, the computing device in vehicle 132 may detect entry of a suspect into a back seat of the vehicle 132 (e.g., via an electronic pressure sensor in a corresponding seat or a motion sensor directed at the back seat and communicably coupled to the computing device) and may generate and transmit a Miranda-type process trigger to the computing device, which may be embedded in a user's portable radio 104 or RSM 106 or in the vehicle 132 computing device or vehicular camera 134, among other possibilities.

If no Miranda-type process trigger is detected by the computing device at step 302, processing proceeds back to step 302, perhaps after a short delay, after which a further determination may be made regarding whether an electronic Miranda-type process trigger has since been detected. On the other hand, if a Miranda-type process trigger is detected at step 302, processing proceeds to step 304.

At step 304, the computing device captures, via an audio and/or video capture device, electronic audio and/or video capture of a suspect and stores one or more unique identifiers of the suspect as a function of the audio and/or video capture. The one or more unique identifiers may include information extracted from a video capture of the suspect or a government issued identifier card associated with the suspect. For example, any one of the video capture devices described above with respect to FIG. 1 may capture a video of the suspect, and perhaps including a step of confirming, via a visual display to the user 102 that the video captured correctly shows the suspect, and provide the captured video to the computing device for further analysis and extraction of unique identifiers associated with the suspect via video analysis.

In one embodiment, the computing device may be directly wiredly connected to the audio and/or video capture device at step 304. For example, the computing device may be the laptop 107 of FIG. 1 and the audio and/or video capture device an integrated camera and/or microphone in the laptop 107. In other embodiments, the computing device may be the portable radio 104 and the audio and/or video capture device an integrated camera 112 or an integrated microphone of an RSM 106 wiredly coupled to the portable radio 104. Additionally or alternatively, the computing device may discover available nearby audio and/or video capture devices via an ad-hoc wireless network by, for example, transmitting a wireless beacon containing information regarding a field of view needed, characteristics of the suspect (e.g., the suspect 162 of FIG. 1), location information of the user (e.g., the user 102 of FIG. 1), suspect, and/or computing device, and/or other information, and may then monitor for responses from audio and/or video capture devices meeting the requested specifications. Still further, the computing device may have access to locally or remotely, or may transmit a request for information from, a database of audio and/or video capture device locations that sets forth one or more of audio and/or video capture device locations, camera imaging parameters (resolution, light sensitivity, light range, focal distances, etc.), fields of view, availability, and camera security access parameters. The database may be pre-populated manually, or may be dynamically created and/or updated as additional audio and/or video capture devices are added to the system and report their availability and one or more other parameters noted above.

When identifying the one or more available audio and/or video capture devices having a field of view (or listening direction) that incorporates the suspect, the computing device may use known location information of the computing device itself (e.g., as a proxy for a location of the suspect) or known location information of a portable radio or mobile radio associated with the user. In some embodiments, the computing device may use orientation information of the user and an additional depth camera to estimate a location of the suspect relative to the computing device, portable radio, or mobile radio. Still other mechanisms could be used to ensure that audio and/or video capture devices identified at step 304 most likely have a field of view incorporating the suspect.

In embodiments in which audio and/or video capture devices are identified that have a pan, tilt, zoom capability (PTZ), they may be controlled to adjust their field of view (or listening direction) to incorporate a location of the user and/or suspect.

If more than one audio and/or video capture device is identified at step 304 as having a field of view (or listening direction) incorporating the current location of the user or suspect, the computing device may select all of the identified audio and/or video capture devices for use in subsequent steps, or may use parameter information provided by the audio and/or video capture devices or accessed via a local or remote database to select a audio and/or video capture device having a best desired parameter fitting a current context of the incident or event (e.g., supporting visible and infrared or having a highest light sensitivity if at night, a highest resolution during the day or if the scene is otherwise lighted, having a largest field of view, or a combination of one or more of the foregoing, etc.). Once one or more audio and/or video capture devices are identified at step 304, and if not already being provided to the computing device, the computing device requests the selected one or more audio and/or video capture devices to begin providing a video stream and/or audio stream capture to the computing device for further processing. The request may involve a simple message requesting streaming to begin, or may involve a handshake process in which each audio and/or video capture device authenticates or otherwise authorizes the computing device to receive the stream(s), which may involve one or more third party or responder agency-owned authentication services. In situations where the one or more audio and/or video capture devices are in a power-saving or inactive mode, the request may inherently or explicitly include a request to exit the power-saving or inactive mode and enter a power-on mode and begin capturing video and/or audio of the suspect.

For those audio and/or video capture devices already providing a video and/or audio stream to the computing device, the computing device may transition from not processing the received video stream and/or audio stream relative to the Miranda-type process trigger event for actions associated therewith, to actively processing the received video stream and/or audio stream relative to the Miranda-type process trigger event for actions associated therewith, consistent with the remainder of this disclosure.

The suspect may be identified in the audio and/or video capture in any number of ways. For example, the suspect may be identified as one taking at least one or more actions from a set of detectable actions or being in a detectable state associated with being a suspect (such as being placed into a back seat of a police car, being handcuffed, having hands in the air or placed on a vehicle, etc.). In other examples, the suspect may be identified by a process of elimination in which a user, first responder, or officer having a known uniform or other clothing or unique feature detectable via the video and/or audio is eliminated from selection as the suspect. Still further, uniquely identifiable information included in captured audio and directed at the suspect may be provided to the computing device to aid in identifying the suspect, such as voice audio including "you with the red cap, move up against the wall," may be used to select the suspect as the one detected in the video as wearing a red cap. In another embodiment, a detected head direction or eye-gaze direction of the user initiating the Miranda-type process detected via video processing or some other user-attached mechanical, electronic, or magnetic device means (such as a compass or electronic eyeglasses/eyewear) and provided to the computing device may be used to identify the suspect as the one in the direction in which the user's head or eyes is or are pointed. In an example where the user is providing commands to the suspect, the suspect may be detected via a determination of a directionality of the commands, detected via spaced microphones or microphone arrays placed at the computing device, at one or more audio and/or video capture devices, on the user, or at other locations and directionality information provided to the computing device to aid in identifying the suspect as one in the direction at which the command was transmitted by the user. In an example where the command is detected as a gesture in video only, the suspect may be detected via a determination of a directionality of the gesture provided by the user (e.g., an out-stretch hand with a pointer finger directed at the suspect). Other possibilities exist as well.

Various algorithms may be used to match suspect actions or suspect states in the one or more video and/or audio streams step 304 with a detectable action or state, including but not limited to geometric hashing, edge detection, scale-invariant feature transform (SIFT), speeded-up robust features (SURF), neural networks, deep learning, genetic, gradient-based and derivative-based matching approaches, Viola-Jones algorithm, template matching, image segmentation and blob analysis, a frequency estimation algorithm, a hidden Markov model algorithm, a Gaussian mixture model algorithm, a pattern matching algorithm, a neural network algorithm, a matrix representation algorithm, or a vector quantization algorithm. Other possibilities exist as well.

When storing one or more unique identifiers of the suspect, the computing device may perform a facial recognition process on the captured video, in comparison to a locally or remotely stored facial recognition database, and provide in return to the computing device an identity of the suspect (e.g., name or other unique governmental identifier) as the unique identifier of the suspect. In other embodiments, the computing device may store the captured video itself as the unique identifier of the suspect, parameters output from the facial recognition process as the unique identifier of the suspect (e.g., such as measurements between a plurality of facial features), or other unique recognition information such as infrared distributions or vein patterns, among other possibilities. Still further, other unique identification information extracted from the captured video could be used as (or included in) the unique identifier of the suspect, including an estimated height and/or weight of the suspect, physical characteristics of the suspect such as hair color and/or eye color, markings or logos present on clothing or skin, types of shoes, clothing characteristics of the suspect including style and/or color descriptions of pants, shoes, or hats currently worn by the suspect, among other possibilities.

In other embodiments, the video analysis function may operate on a video capture of a government issued identifier card associated with the suspect, and may perform similar information extraction functions as set forth immediately above with respect to the video of the suspect extracted from the government issued identifier card. Still further, the video analysis function may perform an optical character recognition (OCR) function on a video capture of the government issued identifier card and may store an identified name and/or other identifying characteristics (such as hair and eye color) detected on the government issued identifier card as the one or more unique identifiers at step 304.

In still other embodiments, an audio analysis function operating at the computing device (or at a remote device to which the computing device transmits the captured voice audio and a request to perform a voice audio recognition process) may perform a voice audio recognition process on captured voice audio of the suspect, in comparison to a locally or remotely stored voice audio recognition database, and provide in return to the computing device an identity of the suspect (e.g., name or other unique governmental identifier) as the unique identifier of the suspect. In other embodiments, the computing device may store the captured voice audio itself as the unique identifier of the suspect, parameters output from the voice audio recognition process as the unique identifier of the suspect (e.g., such as tone variations, volume, etc.), or other unique recognition information, among other possibilities. Still further, other unique identification information extracted from the captured voice audio could be used as (or included in) the unique identifier of the suspect, including a language spoken or a spoken name of the suspect himself or herself, among other possibilities.

At step 306, the computing device selects a particular Miranda-type warning variation from a plurality of stored Miranda-type warning variations based on at least one of a determined age or spoken language of the suspect, and a determined current jurisdiction of the incident scene. The plurality of stored Miranda-type warning variations may be stored at the computing device itself, or may be stored remotely from the computing device but made accessible to the computing device. Each Miranda-type warning variation may be stored as a digital audio file, as a text-file, as a visual display file (e.g., via text, sign language, or some other visual communication mechanism) and played back as text, video, slides, or some other display mechanism, or some combination of the foregoing. Metadata associated with each Miranda-type warning variation and stored within each Miranda-type warning variation file itself or in a separate table or other storage system and which may reference other data structures containing the underlying digital audio file, text-file, or visual display file, may identify an associated age range each is intended for (e.g., minor or adult), an associated language each is intended for (e.g., English, French (non-English), or Spanish (non-English)), and/or an associated jurisdiction each is intended for (e.g., a particular city, state, nation, province, or other jurisdictional boundary within which it is valid and enforceable).

In some embodiments, the computing device may display a selection screen to a user of the computing device, such as the user 102 of FIG. 1, and request that the user select, via a user-interface, one of the plurality of Miranda-type warning variations for play back in a subsequent step. The computing device may then select a particular one of the plurality of stored Miranda-type warning variations as a function of a subsequently detected user-interface input. The user-interface input at step 306 may be the same or similar to the user-interface described with respect to step 302 above.

In other embodiments, the computing device may automatically select, or may sub-select for display in the user-interface noted immediately above, one of the Miranda-type warning variations or less than all available Miranda-type warning variations. For example, the computing device may receive location information from a locationing circuit (such as a GPS receiver circuit or a triangulation determination logic relative to signals received from three or more fixed wireless towers) and may use a determined location of the computing device to automatically select (or sub-select) one or more (but less than all) particular Miranda-type warning variations associated with a current jurisdiction within which the computing device resides. Furthermore, the computing device may use information obtained at step 304, or may separately capture audio and/or video of the suspect and determine separately at step 306 (in a same or similar manner to that already described above with respect to step 304), regarding an age and/or language spoken by the suspect and correspondingly select (or sub-select) one or more (but less than all) particular Miranda-type warning variations associated with an age and/or spoken language of the suspect.

Once the computing device selects a particular Miranda-type warning variation for play back at step 306, processing proceeds to step 308, where the computing device causes the selected particular Miranda-type warning variation from step 306 to be played back to the suspect and, furthermore, stores an indication of which selected particular Miranda-type warning variation was played back to the suspect at step 306. The computing device may play back the selected particular Miranda-type warning variation via a speaker or display integrated with the computing device itself (such as an integrated speaker or display of the RSM 106, the portable radio 104, or the laptop 107), or may do so via another visual display or speaker wirelessly coupled to the computing device via a short-range or long-range transceiver, or wired transceiver, among other possibilities.

The stored indication of the particular Miranda-type warning variations played back to the suspect may be an index that indexes into the plurality of the Miranda-type warning variations stored at the computing device and uniquely identifies one of the Miranda-type warning variations, may be a file name or other unique identifier that uniquely identifies the selected particular Miranda-type warning variation played back, or may be a set of parameters that uniquely identify the selected particular Miranda-type warning variations (e.g., including an age, jurisdiction, and/or language of the Miranda-type warning variation). Other possibilities exist as well.

In some embodiments, and prior to playing back the selected particular Miranda-type warning at step 308, the computing device may play back a pre-stored audio or visual request to confirm that the suspect can hear (or see) and understand the audio (or visual) being electronically output by the computing device (e.g., the same electronic output (display or speaker) that will be used for playing back the selected particular Miranda-type warning variation), and capture, via a same or different audio and/or video capture device as step 304, an acknowledgment from the suspect that he or she has an ability to hear (or see) the pre-stored audio or visual request. The acknowledgment may be, for example, an auditory "yes I can hear and understand the request", a visual nod of the head, or a visual hand gesture sign language indicating ascension, or some other acknowledgment captured consistent with the description of step 310 below.

After playing back the selected particular Miranda-type warning variation at step 308, processing proceeds to step 310, where the computing device captures, via a second audio and/or video capture device (which may be the same or different from the audio and/or video capture device of step 304) an audio and/or video capture of the suspect indicative of an acknowledgment that the selected particular Miranda-type warning variation was received and understood, and stores the corresponding indication of the acknowledgment. The captured acknowledgment is a stored affirmation that the suspect has heard and/or viewed the contents of the selected particular Miranda-type warning variation played back at step 308 and understands the content of the selected particular Miranda-type warning variation, including but not limited to the rights the suspect has relative to an arrest and/or relative to subsequent verbal statements. The audio and/or video capture of the suspect indicative of the acknowledgment may be captured in a same or similar way to that already set forth above with respect to step 304 above. The second audio and/or video capture device may be triggered to start recording by a user thereof, by the computing device immediately after playing back the selected particular Miranda-type warning variation, or may be continuously recording and rely upon the computing device to process the audio and/or video stream for an acknowledgment. For example, and in the case of a continuous recording and reliance upon the computing device to process the audio and/or video stream and identify an acknowledgment, a pre-determined set of visual "acknowledgment objects" may be stored and matched against the audio and/or video detected at step 310. In some embodiments, and instead of storing a separate video and/or audio stream for acknowledgment, the computing device may tag a same video and/or audio stream as used at step 304 at the time that the acknowledgment is detected, among other possibilities.

The suspect may acknowledge the selected particular Miranda-type warning variation played back at step 308 in a number of ways, including but not limited to, by shaking his or her head in a nodding motion, but uttering the words "yes" or "I understand," or by making a hand gesture such as a thumbs-up or a sign-language "yes."

In the event that the second audio and/or video device provides a video capture of the suspect giving a visual indication (e.g., head nod or thumbs up) of acknowledgment (and, e.g., determined via an video processing analysis of the video by the computing device or via an input at the computing device in which the type of acknowledgment captured in the video is identified by a user thereof via an input interface), the computing device may store a copy of the video as the corresponding indication of the acknowledgment. The computing device may additionally or alternatively store a textual description of the corresponding indication of the acknowledgment (e.g., "head nod" or "thumbs up" identified via video analysis and/or user input).

In the event that the second audio and/or video device provides an audio capture of the suspect giving an auditory indication (e.g., a spoken "yes" or "I understand") of acknowledgment (and, e.g., determined via an audio processing analysis of the audio capture by the computing device or via an input at the computing device in which the type of acknowledgment captured in the audio capture is identified by a user thereof via an input interface), the computing device may store a copy of the audio capture as the corresponding indication of the acknowledgment. The computing device may additionally or alternatively store a textual description of the corresponding indication of the acknowledgment (e.g., "spoken 'yes'" or "spoken 'I understand'" identified via audio analysis and/or user input). In still other embodiments, the computing device may provide the captured audio and/or video to a remote device for processing, and may receive, in response, the corresponding indication of the acknowledgment.

If no corresponding indication of the acknowledgment is detected at the computing device for a threshold period of time after the selected particular Miranda-type warning variation played back at step 308, the computing device may prompt a user to request further acknowledgment, may additionally or alternatively prompt a user to replay the selected particular Miranda-type warning variation at step 308, or may automatically replay the selected particular Miranda-type warning variation at step 308 without further user intervention. The threshold period of time may be, for example, 10 s, 30 s, or 60 s.

In some embodiments, a combination of captured audio and/or video of the suspect may be used to generate a "threshold acknowledgment level" as a function of all indications of acknowledgment by the suspect. For example, an acknowledgement metric may set forth, for each corresponding detected auditory or video response from the suspect, how much each action or state contributes towards meeting a minimum acknowledgment threshold in which the computing device can determine that the suspect sufficiently acknowledged the selected particular Miranda-type warning variation played back at step 308. For example, Table I sets forth an example acknowledgment metric for several exemplary instructions:

TABLE I

EXAMPLE ACKNOWLEDGMENT METRIC

| Type of Input: | Detected Ack Type: | Acknowledgment Factor: |
|---|---|---|
| "video" | Head bobbing up and down | 33% |
| | Thumbs up (one hand) | 25% |
| | Thumbs up (both hands) | 40% |
| "audio" | "I understand" | 75% |
| | "Uh-huh" | 25% |
| | "Yep" | 25% |

As set forth above in Table I, various types of input and various detected types of each input may be associated with various levels of acknowledgment (e.g., acknowledgment factors) that may be additive and result in a total acknowledgment factor that does or does not meet a pre-defined threshold acknowledgment level.

Initially, an acknowledgment level for any suspect and any particular play back of the selected particular Miranda-type warning variation may be set to 0%, and the individual acknowledgment factors from the acknowledgment metric used to increment the initial value of 0% based on detected acknowledgment types of the suspect captured by the video and/or audio capture device. For example, a suspect detected giving a single arm thumbs up and saying "yep" at step 310 may be determined to have a total acknowledgment level of 50%. Other calculations or total acknowledgment levels are also possible from Table I.

An overall minimum threshold level of acknowledgment for all types of suspects and all types of incidents may be set to a pre-determined level, such as 40%, 50%, or 70%, below which a failure to acknowledge action may be triggered (as already set forth above). In other embodiments, different threshold levels of acknowledgment may be associated with different types of suspects and/or different types of incidents.

For example, a threshold level of acknowledgment for a minor suspect might be set to a lower 50%, while a threshold level of acknowledgment for an adult suspect might be set to a higher 75%. Additionally or alternatively, a threshold level of acknowledgment for a burglary suspect or incident might be set to a lower 50%, while a threshold level of acknowledgment for a murder suspect or incident might be set to a higher 80%. Other examples are possible as well, and other minimum threshold levels may be implemented as well.

Although Table I sets forth an example compliance metric in a table-like fashion, other ways of organizing the elements of Table I may be implemented in various manners, including but not limited to a list of comma separated values, XML, and a relational database.

In some embodiments, the steps 304 and 310 may be combined at step 310 and provide both a corresponding indication of the acknowledgment and the one or more unique identifiers of the suspect via a same audio and/or video capture from a same audio and/or video device, among other variations.

At step 312, any additional metadata associated with the localized Miranda process may be further captured by the computing device and stored for use in aggregating at step 314. Additional metadata associated with the localized Miranda-type process may include, but is not limited to, one or more of an identifier of a user (such as an officer or other government official) present during the playing back of the particular stored Miranda-type warning variation, a determined geo-location of the computing device and/or the first or second audio and/or video capture device, a date stamp identifying a current date, and one or more time stamps identifying start and/or stop times associated with the first or second electronic audio and/or video captures of the suspect. Other metadata could be included as well.

At step 314, the computing device aggregates the stored unique identifiers of the suspect from step 304, the stored indication of the selected particular Miranda-type warning variation, the stored corresponding indication of the acknowledgment, and the additional stored metadata, into a single data structure. The single data structure may be, for example, a compressed or un-compressed archive file (e.g., an archive format such as .zip, .tar, .iso, .z, .cab, .lzh, or .rar), a database file (e.g., .db, .mdb, .4db), or some other digital storage file type that aggregates the foregoing into a single addressable piece of digital data.

At step 316, the computing device applies an electronic anti-tamper process to the single data structure to generate an anti-tamper indicator. The anti-tamper process could be any one or more of a watermarking process that modifies or distorts or adds watermark data to the single data structure (e.g., video or audio watermarking, database watermarking) as the anti-tamper indicator that may be used in the future to authenticate the single data structure, a digital hashing process (e.g., message digest 5 (MD5) or secure hash algorithm 3 (SHA-3)) that generates a fixed-length message digest code as anti-tamper indicator, or a digital signing process that generates a digital signature as the anti-tamper indicator as a function of a public or private key (e.g., the digital signature algorithm (DSA), which may or may not make use of a public key infrastructure (PKI) for issuing and verifying identity certificates). Other anti-tamper methods could be implemented as well.

Finally, at step 318, the computing device locally stores the single data structure and anti-tamper indicator in non-volatile storage, and/or communicates, via an infrastructure or ad-hoc wireless interface and link(s), or via a wired interface and link(s), the single data structure and anti-tamper indicator to a remote computing device for further storage and/or archival. In embodiments in which the computing device communicates the single data structure and anti-tamper indicator to a remote device for storage, the remote device may provide an acknowledgment of successful receipt (and/or successful authentication of the single data structure via the anti-tamper indicator) to the computing device, which the computing device may then store locally in non-volatile storage. The acknowledgment of successful receipt may include additional information such as a time and date of receipt of the single data structure and anti-tamper indicator, an indication of a result of the authentication process using the anti-tamper indicator, a location at which the single data structure and anti-tamper indicator were stored at the remote computing device, and other information relative to the single data structure and anti-tamper indicator or remote computing device. Only after receiving the acknowledgment of successful receipt may the computing device optionally remove the single data structure and anti-tamper indicator from non-volatile storage. In some embodiments, the computing device may retain the acknowledgment (and/or may retain the single data structure and anti-tamper indicator) for a threshold period of time, such as 1 day, 7 days, 30 days, or indefinitely, prior to permanently removing some or all of the foregoing from non-volatile storage (automatically upon expiration of time or via user or administrator instruction, locally or via remote access, if held indefinitely). If the acknowledgment of a successful upload is not received within a threshold period of time, the computing device may generate and display a visual and/or audio indication of the lack of acknowledgment, and may automatically, or in response to a user input, re-upload the single data structure and anti-tamper indicator to the remote server.

In a further embodiment not illustrated in FIG. 3, and in those circumstances in which the audio and/or video capture device and the second audio and/or video capture device support it, the computing device may, responsive to detecting the Miranda-type process trigger event at step 302, access audio and/or video data buffered at the audio and/or video capture device and/or the second audio and/or video capture device for a period of time prior to the Miranda-type process trigger event being detected at step 302, and store the previously buffered audio and/or video in the single data structure as well, prior to executing steps 316 and/or 318.

In a still further embodiment not illustrated in FIG. 3, and in those circumstances in which biometric readers/sensors are available at the suspect or at the officer, biometric information (e.g., including one or more of a captured heart rate, a captured breathing rate, and a captured body temperature) of the suspect may be received at the computing device and stored in the single data structure as well, prior to executing steps 316 and/or 318. The biometric information may be generated, for example, via a biometric device physically coupled to the suspect (by the suspect himself or herself or by the officer) and transmitted to the computing device via a short-range wireless protocol such as Bluetooth. In other embodiments, a biometric reader capable of reading such biometric information from a distance may be wiredly or wirelessly coupled to the computing device and may provide the biometric information to the computing device at steps 302, 304, 310, or at any other time in the process 300. The biometric reader may be the audio and/or video capture device or the second audio and/or video capture where such biometric information can be extracted from video and/or audio produced by the capture devices. In other instances, the biometric reader may be a separate radar device or thermal imaging device capable of reading suspect biometric information from a distance. Other possibilities exist as well.

3. CONCLUSION

In accordance with the foregoing, a method, device, and system for improving and managing security, digital evidence preservation, and content variations with respect to electronic management of digital data associated with a localized Miranda-type process at an incident is disclosed. As a result of the foregoing, the Miranda-type process can be presented in a more consistent and repeatable manner, evidence of a properly presented Miranda-type process can be captured and stored for future evidentiary use, and the authenticity of a single data structure associated with each presented Miranda-type process can be monitored and updated, providing a technical solution to a difficult and complex technical problem existing in the art.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less all features of a single disclosed embodiment. Thus the following claims are hereby incorporated into the Detailed Description, with each claim standing on its own as a separately claimed subject matter.

What is claimed is:

1. A method for evidentiary management of digital data associated with a localized Miranda-type process at an incident scene, the method comprising:
   detecting, at a computing device at the incident scene, an electronic Miranda-type process trigger event;
   capturing, via an audio and/or video capture device communicatively coupled to the computing device, an electronic audio and/or video capture of a suspect at the incident scene and storing one or more unique identifiers of the suspect as a function of the audio and/or video capture;
   selecting, by the computing device and from a plurality of different stored Miranda-type warning variations, a particular stored Miranda-type warning variation based on at least one of a determined age of the suspect, a determined spoken language associated with the suspect, and a determined current jurisdiction of the incident scene;
   playing back, by the computing device and from an electronic output device communicatively coupled to the computing device, the particular stored Miranda-type warning variation and storing an indication of the particular stored Miranda-type warning variation played back;
   aggregating, by the computing device, the one or more unique identifiers of the suspect and the stored indication of the particular stored Miranda-type warning variation played back into a single data structure;
   applying, by the computing device, an electronic anti-tamper process to the single data structure to generate an anti-tamper indicator indicative of a tamper state of the single data structure and can be applied in a separate process to verify whether data contained in the single data structure is modified after the anti-tamper indicator is generated; and
   one of locally storing and wirelessly or wiredly uploading to a remote computing device, by the computing device, the single data structure and the anti-tamper indicator;
   wherein the plurality of different stored Miranda-type warning variations vary based on a jurisdiction in which the incident scene is located, and includes at least a first stored Miranda-type warning variation applicable to a current jurisdiction in which the incident scene is located and a second stored Miranda-type warning variation applicable to another jurisdiction located outside of the current jurisdiction.

2. The method of claim 1, further comprising:
   capturing, via a second audio and/or video capture device communicatively coupled to the computing device, a second electronic audio and/or video capture of the suspect indicative of an acknowledgement that the particular stored Miranda-type warning variation was received and storing a corresponding indication of the acknowledgment; and
   aggregating, by the computing device, the indication of the acknowledgment into the single data structure.

3. The method of claim 1, further comprising:
   identifying and storing, by the computing device, additional metadata associated with the localized Miranda-type process including one or more of an identifier of an officer present during the playing back of the particular stored Miranda-type warning variation, a determined geo-location of the computing device and/or the audio and/or video capture device, a date stamp identifying a current date, and one or more time stamps identifying start or stop times associated with the electronic audio and/or video capture of the suspect; and aggregating, by the computing device, the additional metadata associated with the localized Miranda-type process into the single data structure.

4. The method of claim 1, further comprising:

wirelessly or wiredly uploading to the remote computing device, by the computing device, the single data structure and the anti-tamper indicator;

receiving, from the remote computing device, an upload acknowledgment of a successful upload of the single data structure and the anti-tamper indicator and that the remote device has determined, via the anti-tamper indicator, that the single data structure has not been tampered with; and storing, by the computing device, the upload acknowledgment.

5. The method of claim 1, wherein the electronic anti-tamper process that generates the anti-tamper indicator is a hash function and the anti-tamper indicator is a fixed-length message digest code generated as an output of the hash function.

6. The method of claim 1, wherein the electronic anti-tamper process that generates the anti-tamper indicator is a watermarking function and the anti-tamper indicator a watermark embedded into the single data structure; and
wherein the watermarking function is one of:
media watermarking function and the anti-tamper indicator a watermark embedded into the one or more unique identifiers of the suspect that includes a still image, video, or audio of the suspect; and
a data structure watermarking function that inserts or distorts bit or character-level data in the single data structure and the anti-tamper indicator is the inserted or distorted bit or character-level data.

7. The method of claim 1, wherein the electronic anti-tamper process that generates the anti-tamper indicator is a digital signing process function and the anti-tamper indicator a digital signature generated as a function of a public or private key.

8. The method of claim 1, wherein the one or more unique identifiers of the suspect are selected from a voice recognition result performed on the voice capture sample, a facial recognition result performed on a captured video of the suspect, a gait analysis of the suspect via the video capture or voice capture sample, physical characteristics of the suspect determined from the video capture including height and weight estimated from the video capture, suspect clothing features including clothing colors extracted from the video capture, and suspect physical characteristics including hair and eye color extracted from the video capture.

9. The method of claim 1, wherein the plurality of different stored Miranda-type warning variations include a minor stored Miranda-type warning variation for play back to minors, an adult stored Miranda-type warning variation for play back to adults, an English-language stored Miranda-type warning variation for play back in the English language, and a non-English language stored Miranda-type warning variation for play back in the non-English language.

10. The method of claim 1, further comprising storing a previously buffered audio and/or video of the suspect, captured for a pre-determined period of time prior to detecting the electronic Miranda-type process trigger event, via the audio and/or video capture device, and responsive to detecting the electronic Miranda-type process trigger event, storing the previously buffered audio and/or video in the single data structure.

11. The method of claim 1, wherein the step of selecting the particular stored Miranda-type warning variation comprises capturing, via an audio capture device, a spoken audio from the suspect, determining a language of the suspect from the captured spoken audio, and selecting the particular stored Miranda-type warning variation as a function of the determined language of the suspect.

12. The method of claim 1, wherein playing back the stored particular Miranda-type warning variation comprises one of playing back an auditory version of the stored particular Miranda-type warning variation via a speaker and a sign-language visual version of the stored particular Miranda-type warning variation via an electronic display.

13. The method of claim 1, the method further comprising capturing biometric information of the suspect and including the captured biometric information in the single data structure.

14. The method of claim 13, wherein the captured biometric information includes one or more of a captured heart rate, a captured breathing rate, and a captured body temperature of the suspect.

15. The method of claim 1, wherein each of the plurality of different stored Miranda-type warning variations set forth information to inform suspects of their rights under law prior to further questioning or arrest by a local or national officer or security agent.

16. A method for evidentiary management of digital data associated with a localized Miranda-type process at an incident scene, the method comprising:

detecting, at a computing device at the incident scene, an electronic Miranda-type process trigger event;

capturing, via an audio and/or video capture device communicatively coupled to the computing device, an electronic audio and/or video capture of a suspect at the incident scene and storing one or more unique identifiers of the suspect as a function of the audio and/or video capture;

selecting, by the computing device and from a plurality of different stored Miranda-type warning variations, a particular stored Miranda-type warning variation based on at least one of a determined age of the suspect, a determined spoken language associated with the suspect, and a determined current jurisdiction of the incident scene;

playing back a pre-stored request to confirm that the suspect can hear and understand audio being produced by an audio output device or can see video being produced by a video output device that will be used for playing back the stored particular Miranda-type warning variation, capturing, via the audio and/or video capture device, audio and/or video of the suspect indicating an acknowledgment of an ability to hear or see the pre-stored request to confirm;

playing back, by the computing device and from an electronic output device communicatively coupled to the computing device, the particular stored Miranda-type warning variation and storing an indication of the particular stored Miranda-type warning variation played back;

aggregating, by the computing device, the one or more unique identifiers of the suspect, the stored indication of the particular stored Miranda-type warning variation played back, and the acknowledgment of the ability to hear or see the pre-stored request to confirm into the single data structure into a single data structure;

applying, by the computing device, an electronic anti-tamper process to the single data structure to generate an anti-tamper indicator indicative of a tamper state of the single data structure and can be applied in a separate process to verify whether data contained in the single data structure is modified after the anti-tamper indicator is generated; and one of locally storing and wirelessly or wiredly uploading to a remote computing device, by the computing device, the single data structure and the anti-tamper indicator.

17. A computing device comprising:

a memory storing non-transitory computer-readable instructions;

a transceiver; and one or more processors configured to, in response to executing the non-transitory computer-readable instructions, perform a first set of functions comprising:

detect an electronic Miranda-type process trigger event;

capture, via an audio and/or video capture device communicatively coupled to the computing device, an electronic audio and/or video capture of a suspect at an incident scene and storing one or more unique identifiers of the suspect as a function of the audio and/or video capture;

select, from a plurality of different stored Miranda-type warning variations, a particular stored Miranda-type warning variation based on at least one of a determined age of the suspect, a determined spoken language associated with the suspect, and a determined current jurisdiction of the incident scene;

play back a pre-stored request to confirm that the suspect can hear and understand audio being produced by an audio output device or can see video being produced by a video output device that will be used for playing back the stored particular Miranda-type warning variation, capture, via the audio and/or video capture device, audio and/or video of the suspect indicating an acknowledgment of an ability to hear or see the pre-stored request to confirm, play back, from an electronic output device communicatively coupled to the computing device, the particular stored Miranda-type warning variation and storing an indication of the particular stored Miranda-type warning variation played back;

aggregate the one or more unique identifiers of the suspect, the stored indication of the particular stored Miranda-type warning variation played back, and the acknowledgment of the ability to hear or see the pre-stored request to confirm into a single data structure;

apply an electronic anti-tamper process to the single data structure to generate an anti-tamper indicator indicative of a tamper state of the single data structure and can be applied in a separate process to verify whether data contained in the single data structure is modified after the anti-tamper indicator is generated; and one of locally store and wirelessly or wiredly upload to a remote computing device the single data structure and the anti-tamper indicator.

18. The computing device of claim 17, wherein each of the plurality of different stored Miranda-type warning variations set forth information to inform suspects of their rights under law prior to further questioning or arrest by a local or national officer or security agent.

* * * * *